United States Patent [19]

Yamai et al.

[11] Patent Number: 4,751,206

[45] Date of Patent: Jun. 14, 1988

[54] LOW THERMAL EXPANSION CERAMIC MATERIAL

[75] Inventors: Iwao Yamai, 202041, Meijo-2-chome, Kita-ku, Nagoya-City 462; Toshitaka Oota, Kani, both of Japan

[73] Assignee: Iwao Yamai, Nagoya, Japan

[21] Appl. No.: 24,631

[22] Filed: Mar. 11, 1987

Related U.S. Application Data

[63] Continuation-in-part of Ser. No. 843,077, Mar. 24, 1986, Pat. No. 4,703,023.

[30] Foreign Application Priority Data

Mar. 14, 1986 [JP] Japan .............................. 61-056385

[51] Int. Cl.$^4$ ............................................ C04B 35/48
[52] U.S. Cl. .................................... 501/102; 501/106
[58] Field of Search ............................. 501/102, 106

[56] References Cited

U.S. PATENT DOCUMENTS

| | | | |
|---|---|---|---|
| 3,268,349 | 8/1966 | Brixner | 501/102 |
| 3,954,525 | 5/1976 | Myles et al. | 501/102 |
| 4,526,765 | 7/1985 | Ito et al. | 423/306 |
| 4,587,172 | 5/1986 | Ray et al. | 501/102 |

OTHER PUBLICATIONS

Yamai, I et al., "Low-Thermal-Expansion Polycrystalline Zirconyl Phosphate Ceramic", J. Am. Cer. Soc. 68(S) 1985 pp. 273–278.

"Zirconyl Phosphate", Ceramic Industry, Jan. 1983, p. 31.

*Primary Examiner*—Mark L. Bell
*Attorney, Agent, or Firm*—Cullen, Sloman, Cantor, Grauer, Scott & Rutherford

[57] ABSTRACT

A low thermal expansion potassium zirconium phosphate is formulated using a metal oxide as a densifier. A mixture of these powders is sintered and quenched.

7 Claims, 1 Drawing Sheet

Lattice Parameters of $KZr_2(PO_4)_3$ vs. Temperature.
Bars attached to each point indicate the standard deviation.
If there is no bar, the standard deviation is smaller than the size of the data point.

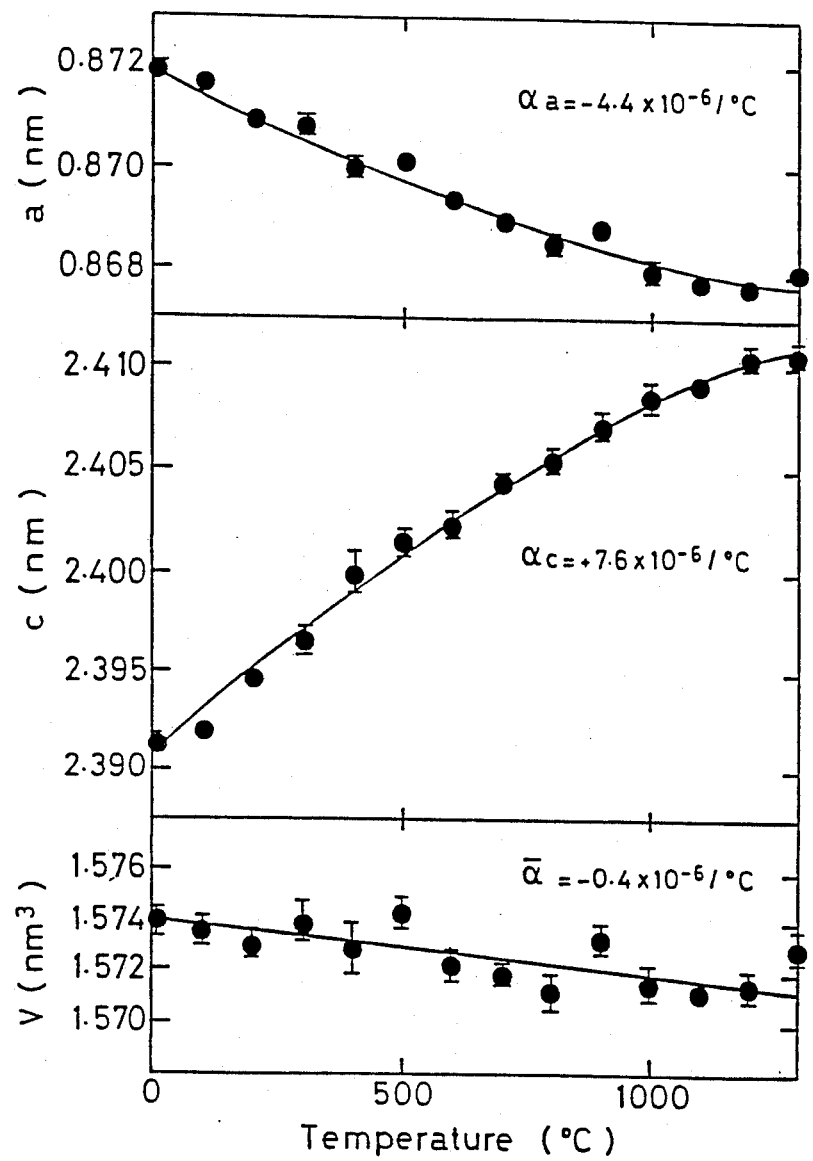
Figure 1  Lattice Parameters of $KZr_2(PO_4)_3$ vs. Temperature.
Bars attached to each point indicate the standard deviation.
If there is no bar, the standard deviation is smaller than
the size of the data point.

LOW THERMAL EXPANSION CERAMIC MATERIAL

RELATED APPLICATION

This application is a continuation-in-part of Ser. No. 843,077, now U.S. Pat. No. 4,703,023 filed Mar. 24, 1986, by Iwao Yamai, one of the co-applicants of the present application.

CLAIM OF PRIORITY

Applicants hereby claim priority pursuant to 35 U.S.C. 119 based upon Japanese application Ser. No. 61-056385 filed on Mar. 14, 1986.

BACKGROUND OF THE INVENTION

This invention relates to potassium zirconium phosphate, useful as a low thermal-expansive material having high strength and high thermal shock resistance.

Several compounds are known in the $ZrO_2.P_2O_5$ system and its derivatives. These compounds include zirconium phosphate ($ZrP_2O_7$ or $ZrO_2.P_2O_5$), zirconyl phosphate ($Zr_2P_2O_9$ or $2ZrO_2.P_2O_5$), sodium zirconium phosphate ($NaZr_2(PO_4)_3$), hydrated compounds of the oxides in the $ZrO_2.P_2O_5$ system, and amorphous materials of this system. The first three compounds of the above examples are being used as low thermal expansion ceramics.

U.S. Pat. No. 4,587,172 to Roy describes sodium zirconium phosphates as low expansion ceramic materials. The optimum compound of that group has a thermal expansion coefficient of $-1.6 \times 10^{-6}$/degree C. Potassium zirconium phosphate, $KZr_2(PO_4)_3$, or the alternative representation of the same compound, $K_2O.4Zr_2.3P_2O_5$, is relatively unknown as a low thermal expansion ceramic. Significantly, it has a thermal expansion coefficient about one-quarter or one-fifth that of sodium zirconium phosphate, i.e., $-0.4 \times 10^{-6}$/degree C. The low thermal coefficient results from the fact that, with increasing temperature, the crystal lattice expands in the c-direction while it contracts in the a-direction. While sodium zirconium phosphates have a similar chemical formula and crystal structure to potassium zirconium phosphate, only the former can be sintered to a dense product without a densifier or sintering aid. Some of applicants' work on this subject is described in an article appearing in the January, 1986 edition of the *Journal of the American Ceramic Society* entitled "Thermal Expansion Behavior of $NaZr_2(PO_4)_3$-Type Compounds."

The use of metal oxides, such as ZnO and MgO, as densifiers or sintering aids for zirconyl phosphate has been suggested in the literature. See, "Low-Thermal-Expansion Polycrystalline Zirconyl Phosphate Ceramic" an article appearing in the May, 1985 edition of the *Journal of the American Ceramic Society*, and co-authored by the present applicants. On this subject, see also co-pending application Ser. No. 843,077, filed Mar. 24, 1986 by Iwao Yamai, one of the co-applicants of the present application. However, because zirconyl phosphate is an oxide system, whereas potassium zirconium phosphate is an alkaline metal system, the formation of the respective liquid phases is different. Therefore, it is not readily apparent that sintering aids used in the former system will be effective in the latter.

U.S. Pat. No. 4,526,765 to Ito discloses various metal oxide zirconium phosphosilicates, including sodium and other cations such as potassium, but does not appear to suggest that such compounds possess the kinds of physical properties obtained by the potassium zirconium phosphates of the present invention.

It is the principal object of the present invention to provide a densifier or sintering aid useful in the fabrication of low thermal expansive potassium zirconium phosphate ceramic materials.

SUMMARY OF THE INVENTION

A low thermal expansion potassium zirconium phosphate, having high strength and thermal shock resistance, is formulated utilizing a metal oxide as a densifier, the metal oxide being selected from the group consisting of magnesium oxide, zinc oxide, chromium oxide, manganese oxide, iron oxide, cobalt oxide, nickel oxide, titanium oxide, niobium oxide and tantalum oxide, preferably present in the range of 0.3% to 10.0% by weight, and most preferably in the range of 1.0% to 5.0%. Fine powders of such metal oxides are mixed with those of the potassium zirconium phosphate and sintered at a temperature of between about 900° and 1600° C. This step is preferably followed by a quenching step.

BRIEF DESCRIPTION OF THE DRAWINGS

FIG. 1 is a graph of the lattice parameters of potassium zirconium phosphate, plotted versus temperature.

DETAILED DESCRIPTION OF THE INVENTION

The production of low thermal expansive potassium zirconium phosphate ceramics according to the present invention essentially involves the process of sintering a compacted powder mixture of such material with at least one densifying aid in the form of a selected metal oxide.

The densification takes place with the presence of a small amount of the liquid phase formed by the reaction between potassium zirconium phosphate and the metal oxide or oxides. The optimum sintering temperature for densification consequently should be related to the lowest solidus temperature of the system. Oxides which have been found to be useful as the densification aid are MgO, ZnO, $Cr_2O_3$, $MnO_2$, $Co_2O_3$, $Fe_2O_3$, NiO, $TiO_2$, $Nb_2O_5$, and $Ta_2O_5$. These oxides are preferably added in a concentration of between about 0.3% to 10.0% by weight, most preferably, in the range of 1.0% to 5.0% by weight. If the concentration is lower than 0.3%, its effect is insignificant. If the concentration is higher than 10%, the properties of the ceramic may be adversely affected.

The densification reaction may be carried out at a temperature in the range of 900° to 1600° C., preferably 1200° to 1400° C. Below 900° C., the reaction could take place too slowly, whereas the $KZr_2(PO_4)_3$ could decompose too rapidly if the temperature is higher than 1600° C. An excessve grain growth may also take place if the densification temperature is too high.

Silica ($SiO_2$) or zirconium silicate may be added up to 10% by weight. Silica is known to suppress grain growth in high temperature processing. It has also been observed that water quenching after sintering does not crack or reduce the strength of the ceramic, but rather strengthens the ceramic, possibly due to the stress induced by quenching.

The following examples will describe in detail the preparation of densified potassium zirconium phosphate ceramics.

EXAMPLE 1

The $KZr_2(PO_4)_3$ fine powder, preferably below 3 micron in particle size, was mixed with two percent by weight of fine MgO powder. The resultant powder was pressed to a bar, 1.5 by 5.0 by 0.15 cm. Then the bar was sintered at 1300° C. for one hour, and then quenched in water. The resultant polycrystalline ceramic exhibited a bending strength of 1550 kg/cm$^2$ and a thermal expansion coefficient (from 0° to 1000° C.) of $-0.2 \times 10^{-6}$/degree C.

EXAMPLE 2

The same fine powder of $KZr_2(PO_4)_3$ as in example 1 above was mixed with fine powders of 9.5% zirconium silicate and 5.0% MgO, both by weight, and pressed to a bar of the same size in example 1. The bar was then sintered at 1300° C. for one hour, and quenched into water. The resultant polycrystalline ceramic exhibited a bending strength of 1940 kg/cm$^2$ and a thermal expansion coefficient of $+0.1 \times 10^{-6}$/degree C.

EXAMPLES 3-22

In the same manner as described in example 1, bars were prepared utilizing the compositions and sintering temperatures and times listed in the following table, and producing the results there indicated. These examples, however, were not quenched following sintering.

| Ex. No. | $KZr_2(PO_4)_3$ (wt. %) | Densifying Aid (Wt. %) | | Firing Condition (°C./hours) | Bending Strength (kg/cm.2) | Thermal Expansion Coefficient ($\times 10.-6$/deg. C.) |
|---|---|---|---|---|---|---|
| 3 | 95.0 | MgO | 5.0 | 1200/16 | 1220 | 0 |
| 4 | 99.9 | MgO | 0.1 | 1400/2 | 80 | −0.4 |
| 5 | 98.0 | MgO | 2.0 | 1300/1* 1000/200 | 1135 | −0.2 |
| 6 | 98.0 | MgO | 2.0 | 1300/2* 1200/250 | 570 | −2.0 |
| 7 | 49.0 | MgO ZrSiO$_4$ | 2.0 49.0 | 1300/16 | 1050 | +2.0 |
| 8 | 47.5 | MgO ZrSiO$_4$ | 5.0 47.5 | 1300/1 | 1390 | +2.1 |
| 9 | 98.0 | ZnO | 2.0 | 1000/2 | 1080 | −0.2 |
| 10 | 99.9 | ZnO | 0.1 | 1200/2 | 50 | −0.4 |
| 11 | 99.7 | ZnO | 0.3 | 1300/0.5 | 660 | −0.3 |
| 12 | 99.0 | ZnO | 1.0 | 1000/4 | 1160 | −0.3 |
| 13 | 92.0 | Cr$_2$O$_3$ | 8.0 | 1300/2 | 670 | −0.5 |
| 14 | 99.0 | MnO$_2$ | 1.0 | 1300/2 | 1040 | −0.2 |
| 15 | 99.7 | MnO$_2$ | 0.3 | 1300/2 | 740 | −0.2 |
| 16 | 90.0 | Fe$_2$O$_3$ | 10.0 | 1350/4 | 540 | −1.0 |
| 17 | 95.0 | Co$_2$O$_3$ | 5.0 | 1350/1 | 970 | 0 |
| 18 | 98.0 | NiO | 2.0 | 1300/1 | 1290 | −0.1 |
| 19 | 95.0 | Nb$_2$O$_5$ | 5.0 | 1500/1 | 1100 | +0.5 |
| 20 | 95.0 | Nb$_2$O$_5$ | 5.0 | 1400/1 | 1100 | +0.1 |
| 21 | 98.0 | TiO$_2$ | 2.0 | 1600/0.5 | 1050 | +0.3 |
| 22 | 95.0 | Ta$_2$O$_5$ | 5.0 | 1500/2 | 980 | +0.5 |

*In examples 7 and 8, the specimen was heated to the first indicated temperature, then air cooled, and then reheated to the second indicated temperature.

Exemplary uses for the products of the present invention include furnace refractories subject to thermal shock and thermal shielding materials such as the protective tiles on space vehicles which shield the vehicle from the heat of re-entry to the atmosphere.

This invention may be further developed within the scope of the following claims. Accordingly, the foregoing specification is to be interpreted as illustrative of only a few operative examples of the present invention, rather than in a strictly limited sense.

We now claim:

1. A composition of matter consisting essentially of: potassium zirconium phosphate and a metal oxide present in the range of from about 0.3% to about 10.0% by weight, said metal oxide being selected from the group consisting of magnesium oxide, zinc oxide, chromium oxide, manganese oxide, iron oxide, cobalt oxide, nickel oxide, titanium oxide, niobium oxide and tantalum oxide.

2. The composition of claim 1 wherein said metal oxide content is from about 1.0% to about 5.0% by weight.

3. A composition of matter consisting essentially of:
    (a) potassium zirconium phosphate;
    (b) a metal oxide present in the range of from about 0.3% to about 10.0% by weight, said metal oxide being selected from the group consisting of magnesium oxide, zinc oxide, chromium oxide, manganese oxide, iron oxide, cobalt oxide, nickel oxide, titanium oxide, niobium oxide and tantalum oxide; and
    (c) a member of the group consisting of silica and zirconium silicate in an amount less than about 10.0% by weight.

4. The composition of claim 3 wherein said metal oxide content is from about 1.0% to about 5.0% by weight.

5. A process for production of a low thermal-expansive ceramic comprising the steps of mixing and compacting a mixture of fine powders consisting essentially of potassium zirconium phosphate and a metal oxide densifying aid selected from the group consisting of magnesium oxide, zinc oxide, chromium oxide, manganese oxide, iron oxide, cobalt oxide, nickel oxide, titanium oxide, niobium oxide and tantalum oxide, said metal oxide content being between about 0.3% and 10.0% by weight, and thereafter sintering said compacted mixture at a temperature of between about 900° and 1600° C. for a time in the range of about 0.5 to 16 hours.

6. The process of claim 5 wherein said metal oxide content is from about 1.0% to about 5.0% by weight.

7. The process of claim 5 wherein said sintering step is followed by a water quenching step.

* * * * *